United States Patent
Madala et al.

(10) Patent No.: US 11,909,756 B2
(45) Date of Patent: Feb. 20, 2024

(54) AUTOMATIC IDENTIFICATION OF CHANGE REQUESTS TO ADDRESS INFORMATION TECHNOLOGY VULNERABILITIES

(71) Applicant: ServiceNow, Inc., Santa Clara, CA (US)

(72) Inventors: Vamsi Krishna Madala, Vijayawada (IN); Alexander House, Santa Cruz, CA (US); Brian James Waplington, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 378 days.

(21) Appl. No.: 17/400,863

(22) Filed: Aug. 12, 2021

(65) Prior Publication Data

US 2023/0051921 A1 Feb. 16, 2023

(51) Int. Cl.
*H04L 29/06* (2006.01)
*H04L 9/40* (2022.01)
*G06N 20/00* (2019.01)

(52) U.S. Cl.
CPC ......... *H04L 63/1433* (2013.01); *G06N 20/00* (2019.01); *H04L 63/205* (2013.01)

(58) Field of Classification Search
CPC .... H04L 63/1433; H04L 63/205; G06N 20/00
See application file for complete search history.

(56) References Cited

U.S. PATENT DOCUMENTS

| | | | | |
|---|---|---|---|---|
| 11,290,325 | B1* | 3/2022 | Kaluza | H04L 41/0895 |
| 11,777,984 | B1* | 10/2023 | Prayaga | H04L 63/1441 |
| | | | | 726/23 |
| 2011/0138469 | A1* | 6/2011 | Ye | H04L 63/1441 |
| | | | | 709/224 |
| 2019/0164100 | A1* | 5/2019 | Rotta | G06Q 10/067 |
| 2020/0249928 | A1* | 8/2020 | Zeng | G06F 9/5038 |

OTHER PUBLICATIONS

Xu, Zhengzi, et al. "Spain: security patch analysis for binaries towards understanding the pain and pills." 2017 IEEE/ACM 39th International Conference on Software Engineering (ICSE). IEEE, 2017. (Year: 2017).*

* cited by examiner

*Primary Examiner* — Ka Shan Choy
(74) *Attorney, Agent, or Firm* — Van Pelt, Yi & James LLP

(57) ABSTRACT

A machine learning model is trained based at least on previous change requests, wherein each of the previous change requests are associated with a controlled management of a lifecycle of a change to an information technology environment. A security vulnerability of the information technology environment is identified. Using the trained machine learning model, a corresponding match score for each of a plurality of pending change requests is determined for the security vulnerability. An indication of whether a resolution specification for the security vulnerability is to be linked with one of the plurality of pending change requests selected based on a factor associated with its corresponding match score is received.

20 Claims, 6 Drawing Sheets

AUTOMATIC IDENTIFICATION OF CHANGE REQUESTS TO ADDRESS INFORMATION TECHNOLOGY VULNERABILITIES

BACKGROUND OF THE INVENTION

When vulnerabilities are identified in an information technology environment, a vulnerability response such as a remediation plan is typically created. A remediation plan can address the identified vulnerabilities and may include actions such as patching or upgrading impacted software or hardware for a targeted group of information technology assets. In some scenarios, a remediation plan involves one or more change requests. The change requests may be submitted by information technology remediation owners to information technology service management administrators who have the proper privileges and access to implement the requested changes of the remediation plan to the impacted software and/or hardware. When implemented, a change request may require a scheduled downtime for performing the required maintenance as well as a following through with communication workflow such as a process for issuing notifications to notify users of intended downtime and of completed updates.

BRIEF DESCRIPTION OF THE DRAWINGS

Various embodiments of the invention are disclosed in the following detailed description and the accompanying drawings.

DETAILED DESCRIPTION

Figure 1:
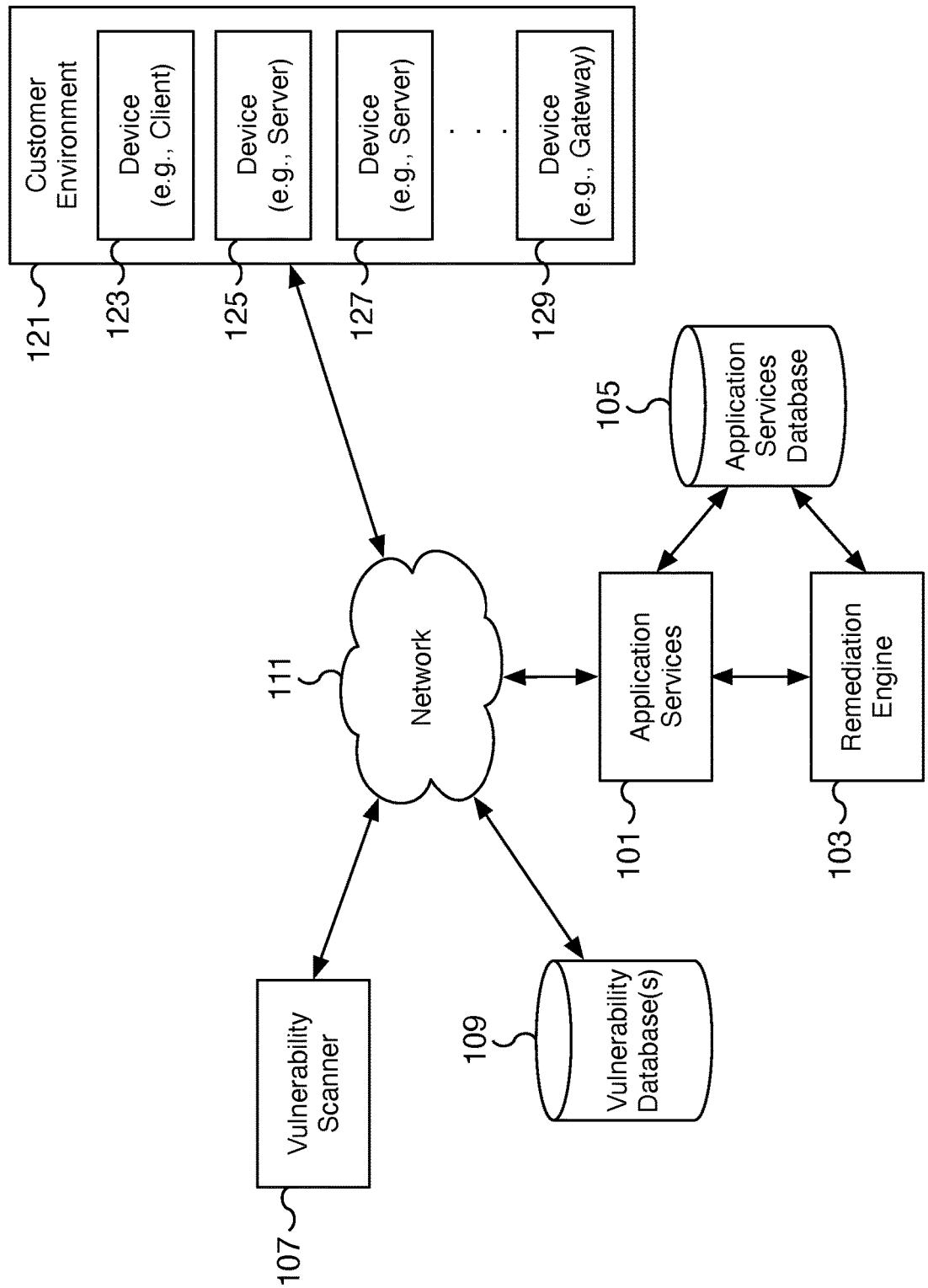
FIG. 1 is a block diagram illustrating an example of a network environment for the management of information technology vulnerabilities.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The automatic identification of change requests to address information technology vulnerabilities is disclosed. For example, using the disclosed techniques, vulnerability responses for identified vulnerabilities within an information technology environment are matched to existing or pending change requests. By associating a new vulnerability response with an existing change request, the remediation plan for the identified vulnerability is more promptly and efficiently addressed. For example, an existing change request for a software update to a group of information technology assets is automatically identified as also addressing the identified security vulnerability for a group of vulnerable assets. Instead of creating and submitting a new change request, the existing change request that is automatically identified is associated with the vulnerability response to remediate the identified vulnerability. By associating a vulnerability response to an existing change request, duplicate and redundant change requests are further avoided. In their place, a single change request can be performed to address multiple issues including multiple vulnerabilities identified at different times.

In some embodiments, a new vulnerability response for an identified vulnerability is automatically matched to existing change requests by utilizing a proposed change request for the identified vulnerability. For example, the proposed change request is used to match to existing change requests in the system by applying a trained machine learning model to predict and rank matching change requests. The machine learning model can be trained on properties of the vulnerability response and/or the proposed change request using, for example, associated historical data. The input features for the machine learning model can include features such as title, various descriptions including a short and/or full description, and an implementation plan, among others. In some embodiments, the closest matching change requests are presented to an information technology remediation owner. The remediation owner can select from the recommended change requests and associate a selected change request with the vulnerability response as part of a process to remediate the identified vulnerability. If no recommended change request is found or selected, a new change request can be created and submitted to address the identified vulnerability.

In some embodiments, a machine learning model is trained based at least on previous change requests, wherein each of the previous change requests are associated with a controlled management of a lifecycle of a change to an information technology environment. For example, a lifecycle of a change to an information technology environment can include a controlled management workflow process to submit and apply change requests. The application of a change request can require an administrator, such as an information technology service management administrator, who has the proper access and administration privileges to modify the targeted information technology assets. For example, implementation details of a change request can require permission and access to perform actions such as updating software, migrating user permissions, changing hardware components, and relocating hardware devices, etc. In some embodiments, a communication workflow is followed that can include steps such as notifying impacted users when intended maintenance to relevant portions of the information technology environment will occur and when the maintenance is complete. In various embodiments, a machine learning model is trained using the previously submitted and/or applied change requests and their associated features. For example, a change request can include features such as a title, a short description, a longer full or complete description, an implementation plan, and/or a target set of assets for applying the change request to, among others. In some embodiments, one or more features can be expressed as filters or qualifiers. For example, a list of target assets can be identified individually by name and/or by a unique identifier such as an Internet Protocol (IP) address and/or as a collection of assets by a filter or another similar qualifier. For example, in various embodiments, a list of target assets can be identified by regions, by domain masks, by network configuration, or by another group identifier instead of identifying each asset individually.

In some embodiments, a security vulnerability of the information technology environment is identified. For example, vulnerability scans can be performed on the assets within the information technology environment to identify potential security issues. The scans can be performed routinely to catch newly identified vulnerabilities since the last scan and can rely on one or more known and published vulnerability databases. In various embodiments, the vulnerabilities detected are identified with a description and can include fields such as a title, description, and known resolutions to fixing the vulnerability.

In some embodiments, the trained machine learning model is used to determine for the security vulnerability a corresponding match score for each of a plurality of pending change requests. For example, a trained machine learning model is applied to existing change requests to predict match scores, where each predicted match score corresponds to a confidence rating that a particular change request will address the security vulnerability. In some embodiments, a predicted match score has a value between 0.0 and 1.0. A change request with a match score close to 1.0 is a strong match whereas a change request with a match score close to 0.0 is a poor match.

In some embodiments, an indication of whether a resolution specification for the security vulnerability is to be linked with one of the plurality of pending change requests selected based on a factor associated with its corresponding match score is received. For example, an information technology remediation owner can select from the pending change requests based on their corresponding predicted match scores. In some embodiments, the pending change requests with a predicted match score that exceeds a threshold confidence level are recommended as potential matching change requests to a remediation owner. The remediation owner can select from the recommended change requests to associate the selected pending change request with the vulnerability solution for the identified vulnerability. If no pending change request is a good match or if no pending change request is selected, a remediation owner can create a new change request to address the security vulnerability.

FIG. 1 is a block diagram illustrating an example of a network environment for the management of information technology vulnerabilities. In the example shown, the network environment includes a remediation system made up of application services 101, remediation engine 103, and application services database 105. Application services 101 are cloud-based application services including information technology management services for addressing information technology vulnerabilities. Application services 101 include an interface for a remediation system as a remediation system service. In various embodiments, application services 101 provide a user interface for cloud-based services related to identifying and/or submitting change requests for addressing security vulnerabilities. The remediation service of application services 101 relies on remediation engine 103 and application services database 105, for example, to identify and match pending change requests for resolving an identified vulnerability, such as a security vulnerability, found in customer assets of customer information technology environment 121. The vulnerabilities can be detected by vulnerability scanner 107 using one of the databases of vulnerability databases 109.

In the example shown, customer information technology environment 121 is the information technology environment of one of the users of application services 101 and includes multiple hardware devices including devices 123, 125, 127, and 129, as examples. In various embodiments, the devices of customer information technology environment 121, such as devices 123, 125, 127, and 129, run application processes that interact with one another and/or with other computing devices outside of customer information technology environment 121. As shown in FIG. 1, devices 123, 125, 127, and 129 can be a variety of different devices and can include different clients, servers, and gateways, among others. Each of the devices can be scanned for vulnerabilities by vulnerability scanner 107.

In various embodiments, application services 101, remediation engine 103, and application services database 105 are all communicatively connected and may exist on the same (or different) local network. In the example shown, vulnerability scanner 107, vulnerability databases 109, application services 101, and customer information technology environment 121 are all communicatively connected via network 111. Network 111 can be a public network, such as the Internet, or private network. In various embodiments, application services database 105 is a configuration management database (CMDB) and can be used to help manage and track customer assets of customer information technology environment 121 such as devices 123, 125, 127, and 129 and their related configurations. For example, each managed asset can be represented as a configuration item and application services database 105 can store information related to managed assets, such as the hardware and/or software configuration of a computing device, as configuration items. Similarly, application services database 105 can be used to track and store change requests for the managed assets. In various embodiments, application services database 105 provides persistent storage and allows a user, such as a remediation owner or administrator, to remotely manage assets tracked using application services database 105 via application services 101.

In the example shown, application services 101 can be accessed by a remote client such as a remediation owner or an administrator of customer information technology environment 121 using a client device such as device 123. By using application services 101, a vulnerability scan of customer information technology environment 121 can be initiated, which invokes vulnerability scanner 107 to identify vulnerabilities tracked in vulnerability databases 109. Once the vulnerabilities are identified, a remediation owner can group the impacted assets into one or more vulnerability groups. Instead of creating new change requests to resolve the vulnerabilities of the different vulnerability groups, the remediation owner can utilize application services 101 and consequently remediation engine 103 and application services database 105 to identify whether existing pending change requests can resolve the identified vulnerabilities. Selecting from recommended change requests, the remediation owner can associate a pending change request, if a recommended match exists, for each vulnerability group to resolve the associated vulnerability.

In various embodiments, the components shown in FIG. 1 may exist in various combinations of hardware machines. Although single instances of components have been shown to simplify the diagram, additional instances of any of the components shown in FIG. 1 may exist. For example, application services 101 and remediation engine 103 may include one or more cloud-based servers. In some embodiments, application services 101 and remediation engine 103 are implemented on the same hardware server. Similarly, application services database 105 may be replicated or distributed across multiple components and may not be directly connected to application services 101 and/or remediation engine 103. As another example, devices for a customer's information technology environment can be deployed across multiple different information technology environments and customer information technology environment 121 is an example of one information technology environment. Additional information technology environments for other customers that also rely on application services 101 can also exist but are not shown. In some embodiments, components not shown in FIG. 1 may also exist.

Figure 2:
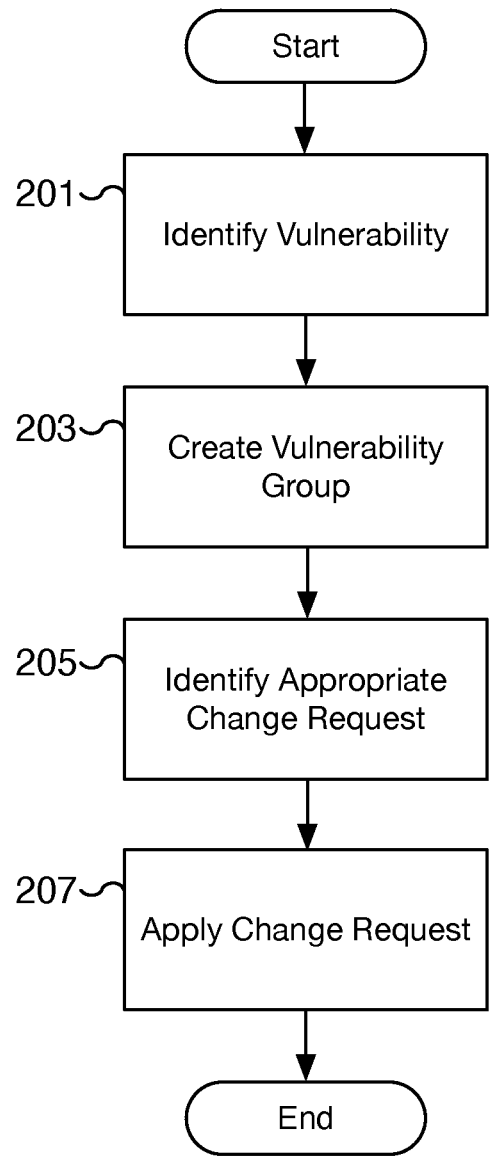
FIG. 2 is a flow chart illustrating an embodiment of a process for identifying and addressing an information technology vulnerability.

FIG. 2 is a flow chart illustrating an embodiment of a process for identifying and addressing an information technology vulnerability. Using the process of FIG. 2, a user, such as a remediation owner or an administrator, can identify and resolve a vulnerability, such as a security vulnerability, for one or more information technology assets. In some embodiments, the process of FIG. 2 is performed by accessing an application service such as a cloud-based service of application services 101 of FIG. 1 and utilizing a remediation engine such as remediation engine 103 of FIG. 1 to identify recommendations from pending change requests that potentially address an identified vulnerability in a customer asset. In some embodiments, the customer asset is an information technology asset of customer information technology environment 121 of FIG. 1. In some embodiments, the vulnerability is identified by a vulnerability scanner such as vulnerability scanner 107 of FIG. 1. In some embodiments, the identified vulnerability, pending and recommended change requests, customer asset information, and related configuration data are stored in a database such as application services database 105 of FIG. 1. Although the process of FIG. 2 is described with respect to identifying a single vulnerability, the same process can be applied to identifying multiple (and potentially overlapping) vulnerabilities among information technology assets.

At 201, a vulnerability is identified. For example, a vulnerability scanner is utilized to scan one or more information technology environments. The scan can utilize one or more vulnerability databases updated with the most current vulnerabilities. For example, one or more vulnerability databases such as vulnerability databases 109 of FIG. 1 are frequently updated with newly identified vulnerabilities. The utilized vulnerability databases can include suggested remediation plans for identified vulnerabilities. In various embodiments, one or more impacted assets are identified along with the corresponding vulnerability. The assets scanned and identified can be represented as configuration items in a configuration management database. For example, application services database 105 of FIG. 1 can be a configuration management database (CMDB) for tracking assets and their corresponding vulnerabilities, remediation plans, and resolution states.

At 203, a vulnerability group is created. For example, a vulnerability group representing a group of vulnerable assets is created. In some embodiments, the group is based at least on a shared vulnerability identified at 201 but other factors can be utilized to define a group as well. For example, a group can be defined based on one or more condition filters to automatically add (or remove) vulnerable assets to (or from) the group. Example condition filters include filters based on region, domain mask, network configuration, device type, hardware configuration, software configuration, last update, and/or another group condition rule. In various embodiments, a vulnerability group can be used to track the status of the vulnerability impacting the associated assets such as the different states of remediation. In some embodiments, each vulnerability group is assigned a unique vulnerability group identifier.

At 205, an appropriate change request is identified. For example, a change request used to address the vulnerability identified at 201 is linked and/or associated with the vulnerability group created at 203. The change request can describe an update process for updating the assets of the vulnerability group. For example, a change request can describe the appropriate software patches to apply, the sequence the patches should be installed, and the verification tests to run to confirm the proper installation of the patches, among other update steps. In some embodiments, the appropriate change request is an existing change request that is already pending. By identifying a pending change request as the appropriate change request, a new change request that may duplicate and/or add additional work is not required, which significantly improves the speed, reliability, and scalability of the remediation process. In some scenarios, there does not exist a pending change request that addresses the identified vulnerability for the vulnerability group. In the event no matching request exists, a new change request is created and identified as the appropriate change request for the vulnerability group. In some embodiments, an information technology remediation owner assigns or links a change request to a vulnerability group.

At 207, a change request is applied. For example, the change request identified at 205 is applied to a group of assets including the assets of the vulnerability group created at 203. In some embodiments, the change request is applied by an administrator, such as an information technology service management administrator, who has the proper privileges and access to implement the requested changes of the change request to the impacted assets. Although the two roles can be performed by the same person, the information technology remediation owner who links a change request to a vulnerability group at 205 can be different from the information technology service management administrator who carries out the change request at 207. In some embodiments, once the change request is applied, the corresponding configuration items of the vulnerability group are updated in a configuration management database (CMDB). The update can include updating the remediation state of the vulnerability group and associated assets.

Figure 3:
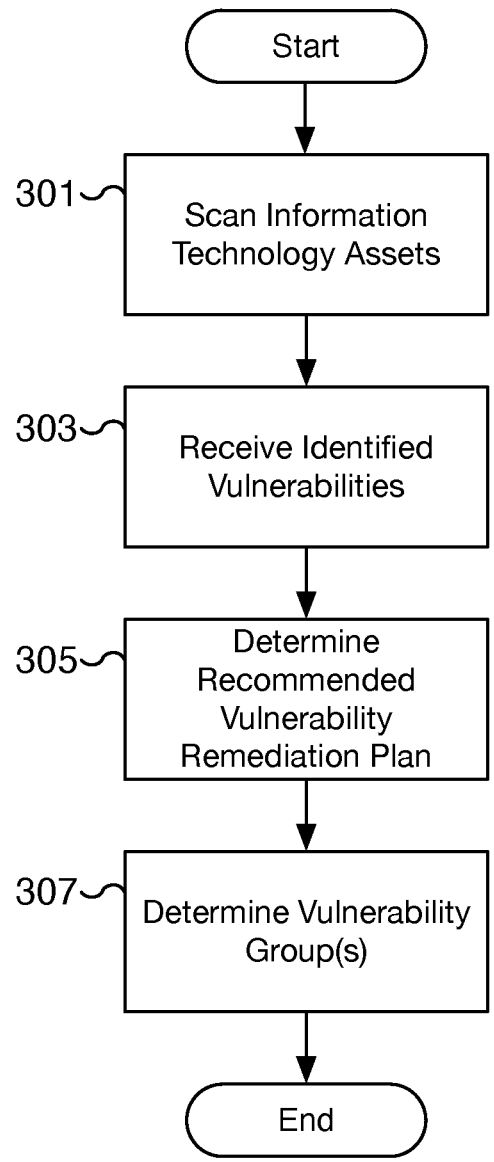
FIG. 3 is a flow chart illustrating an embodiment of a process for determining a vulnerability group in an information technology environment.

FIG. 3 is a flow chart illustrating an embodiment of a process for determining a vulnerability group in an information technology environment. Using the process of FIG. 3, a user, such as an information technology remediation owner, can identify vulnerabilities and associate them with a group of assets as a vulnerability group. In some embodiments, the process of FIG. 3 is performed at 201 and/or at 203 of FIG. 2 at least in part by an application service such as a cloud-based service of application services 101 of FIG. 1 and/or by a remediation engine such as remediation engine 103 of FIG. 1. In some embodiments, the relevant customer assets are assets of an information technology environment such as customer information technology environment 121 of FIG. 1. In some embodiments, the vulnerability is identified by a vulnerability scanner such as vulnerability scanner 107 of FIG. 1 that relies on one or more vulnerability databases such as vulnerability databases 109 of FIG. 1. In some embodiments, the identified vulnerability, associated assets, corresponding vulnerability group, and related configuration data are stored in a database such as application services database 105 of FIG. 1. In some embodiments, application services database 105 is a configuration management database (CMDB).

At 301, information technology assets are scanned for vulnerabilities. For example, assets of an information technology environment are scanned for vulnerabilities including security vulnerabilities by a vulnerability scanner such as vulnerability scanner 107 of FIG. 1. A vulnerability scan can utilize one or more vulnerability databases, including third-party vulnerability databases, updated with the most current vulnerabilities. For example, one or more vulnerability databases such as vulnerability databases 109 of FIG. 1 are frequently updated with newly identified vulnerabilities. In various embodiments, a vulnerability scan identifies assets of an information technology environment that are impacted by a known vulnerability and that require remediation to resolve the vulnerability. The scanned assets can be tracked as configuration items in a configuration management database (CMDB). In some embodiments, the vulnerability scans are scheduled and can be performed at regular intervals.

At 303, identified vulnerabilities are received. For example, the list of identified vulnerabilities and their impacted assets are received. In some embodiments, a single asset can be impacted by multiple vulnerabilities and a single vulnerability can impact multiple assets. At 303, the list of vulnerabilities can be received, for example, from a third-party vulnerability scanner and imported into a vulnerability remediation system such as a remediation system implemented using remediation engine 103 of FIG. 1 and made accessible via application services 101 of FIG. 1.

At 305, a recommended vulnerability remediation plan is determined. In some embodiments, as part of identifying an asset impacted by a vulnerability, a recommended remediation plan is determined for resolving the identified vulnerability. For example, a vulnerability database can store details of a vulnerability including a vulnerability identifier, a vulnerability name, and a suggested remediation plan for resolving the vulnerability if detected. In various embodiments, different vulnerabilities can require different remediation steps as can different assets impacted by the same vulnerability. For example, different customer devices depending on their configuration can require different software patches to address the same identified vulnerability. In various embodiments, a remediation plan can be retrieved from a vulnerability database and presented to an information technology remediation owner via a remediation system.

At 307, one or more vulnerability groups are determined. For example, one or more assets are grouped together into a vulnerability group. Each vulnerability group can be created based on shared properties, such as a shared vulnerability and/or remediation plan. For example, multiple client devices can be impacted by the same vulnerability and require the same set of software patches to be installed using the same process. The impacted client devices can be grouped together as a vulnerability group. As another example, two different devices may be impacted by different vulnerabilities but require the same remediation plan. In some embodiments, the two different devices are also grouped together as a vulnerability group.

In some embodiments, the vulnerability groups are determined automatically by a remediation system and/or with the input of an information technology remediation owner. For example, an information technology remediation owner can manually create vulnerability groups for impacted assets using the information from steps 303 and/or 305. In various embodiments, other factors can be utilized to define a vulnerability group as well. For example, a group can be defined based on one or more condition filters to automatically add (or remove) vulnerable assets to (or from) the group. Example condition filters include filters based on region, domain mask, network configuration, device type, hardware configuration, software configuration, last update, and/or another group condition rule. A vulnerability group can be used to track the status of the vulnerability impacting the associated assets such as the different states of remediation. In some embodiments, each vulnerability group is assigned a unique vulnerability group identifier.

Figure 4:
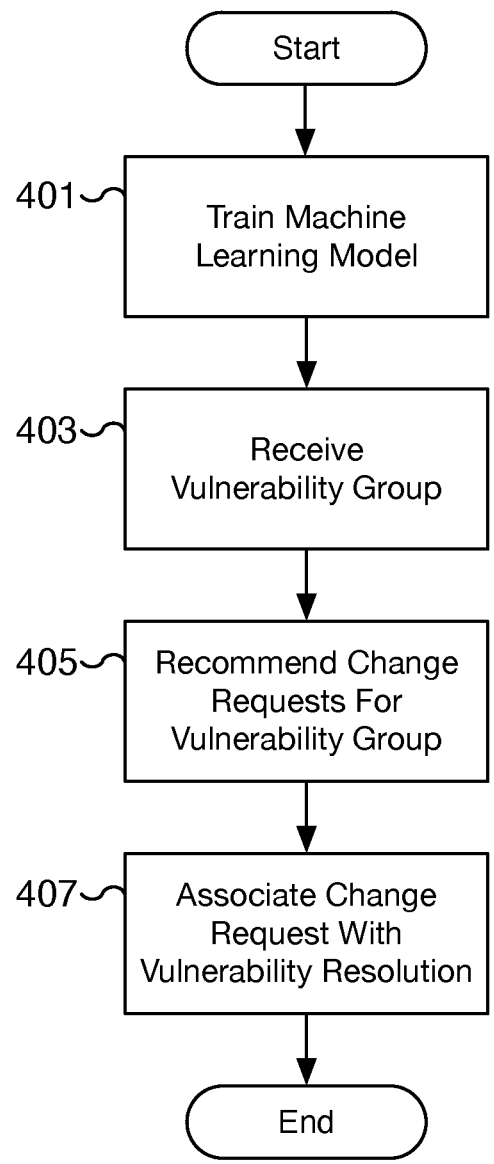
FIG. 4 is a flow chart illustrating an embodiment of a process for assigning a change request to a vulnerability group.

FIG. 4 is a flow chart illustrating an embodiment of a process for assigning a change request to a vulnerability group. Using the process of FIG. 4, a user, such as an information technology remediation owner, can assign or link a change request to a vulnerability group. The assigned change request can be an existing and pending change request that meets the requirements for resolving the vulnerabilities of the vulnerability group. In some embodiments, the process of FIG. 4 is performed at 205 of FIG. 2 at least in part by an application service such as a cloud-based service of application services 101 of FIG. 1 and/or by a remediation engine such as remediation engine 103 of FIG. 1. In some embodiments, the vulnerable assets of the vulnerability group are assets of an information technology environment such as customer information technology environment 121 of FIG. 1. In some embodiments, the vulnerability group and related configuration data are stored in a database such as application services database 105 of FIG. 1.

At 401, a machine learning model is trained. For example, a machine learning model for predicting a matching change request for an input vulnerability group is trained. In some embodiments, the machine learning model infers match scores for pending change requests, where an inferred match score is based on the confidence level a pending change request matches an input vulnerability group. In some embodiments, the model is a machine learning similarly model although other machine learning models such as a classification model can be appropriate as well. In various embodiments, the machine learning model is trained using past change requests and in particular using the fields of the change request training data. For example, fields of a change request that are utilized as different features for training can include an implementation plan field and various description fields such as a short description and a longer description field. Example change requests of the training data can include an implementation plan field populated with a preferred solution for remediating a vulnerability and a short description field populated with the severity of a vulnerability and additional vulnerability information such as a publicly disclosed security profile of the vulnerability. In some embodiments, the vulnerability information includes information from a shared and/or public vulnerability database and can include Common Vulnerabilities and Exposures (CVE) information such as a CVE identifier, a description or explanation, dates, and comments of the vulnerability. Additionally, a description field of change requests of the training data can include a second longer description field that can include vulnerability information related to the particular information technology environment.

In some embodiments, a change request matches a vulnerability group if the implemented change request resolves or likely resolves the vulnerabilities of the vulnerability group. In some embodiments, the machine learning model can be applied to return a set of recommended change requests that best match a vulnerability group. The results can be returned in ranked order.

In various embodiments, each user of a remediation system has a unique machine learning model for predicting recommended change requests. For example, different customers each utilize a different trained machine learning model. In some embodiments, a customer's model is trained using past change requests and vulnerability groups as training data. For example, change requests linked to a vulnerability group by a customer's remediation owner can be used as training data for training the customer's machine learning model. In some embodiments, each customer's model is a unique model but is based on a centralized model.

At 403, a vulnerability group is received. For example, a defined vulnerability group is received. The vulnerability group can specify a group of assets impacted by one or more vulnerabilities. By grouping the assets together, the vulnerabilities of the assets should be addressed together by applying the same change request to each asset of the group. In some embodiments, the applied change request can be made up of a group or series of change requests that are each applied to address the vulnerability group.

At 405, change requests for the vulnerability group are recommended. For example, one or more change requests are recommended for resolving the vulnerabilities of the vulnerability group received at 403. The recommended change requests are determined by applying the machine learning model trained at 401. For example, change requests with match scores that exceed a configured confidence threshold value are recommended as potentially matching change requests for the vulnerability group. In various embodiments, the recommended change requests include pending change requests. By recommended a pending change request, the vulnerabilities of the vulnerability group can be addressed along with the other updates of the change request, avoiding the downtime of duplicative updates from implementing multiple change requests.

At 407, a change request is associated with a vulnerability resolution. For example, one of the change requests recommended at 405 is selected and linked to the vulnerability group. In some embodiments, the associated change request is identified as a resolution for remediating or resolving the vulnerabilities of the group. In various embodiments, the change request can be selected by an information technology remediation owner based on the recommendations provided at 405 and the selection is received at 407. For example, a remediation owner can select and link a recommended change request to the vulnerability group using a graphical user interface of a remediation service. The graphical user interface can show recommended change requests along with their predicted match scores and implementation details. In some embodiments, a change request is automatically associated with the vulnerability group and a remediation owner has the option to approve the automatic assignment.

Figure 5:
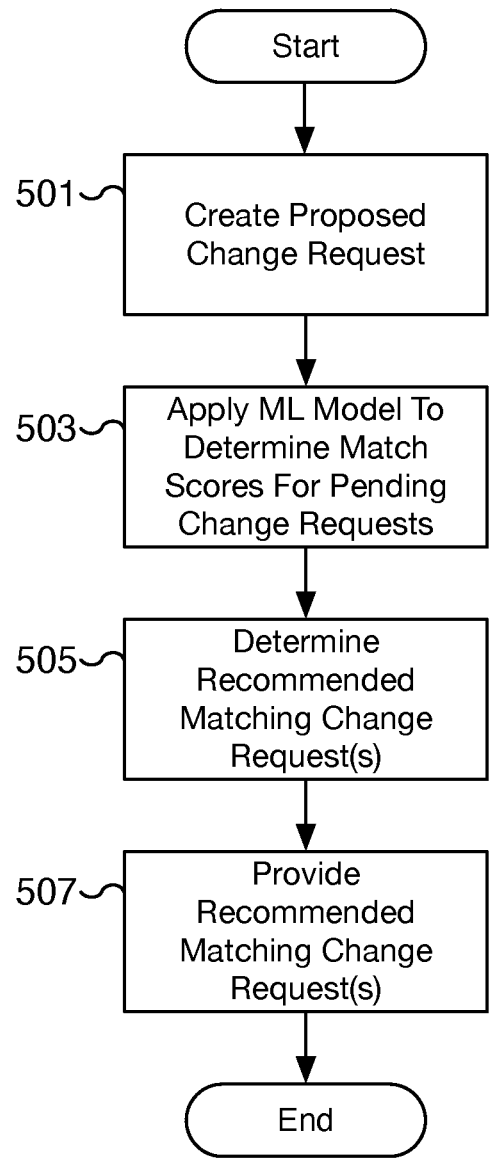
FIG. 5 is a flow chart illustrating an embodiment of a process for determining recommended change requests for a vulnerability group.

FIG. 5 is a flow chart illustrating an embodiment of a process for determining recommended change requests for a vulnerability group. Using the process of FIG. 5, pending change requests are analyzed and those that match a received vulnerability group are designated as recommended change requests. In some embodiments, the process of FIG. 5 is performed at 205 of FIG. 2 and/or at 405 of FIG. 4 at least in part by an application service such as a cloud-based service of application services 101 of FIG. 1 and/or by a remediation engine such as remediation engine 103 of FIG. 1. In some embodiments, the vulnerable assets of the vulnerability group are assets of an information technology environment such as customer information technology environment 121 of FIG. 1. In some embodiments, the vulnerability group and related configuration data are stored in a database such as application services database 105 of FIG. 1.

At 501, a proposed change request is created. For example, a proposed change request is created based on the vulnerability group and associated assets and vulnerabilities. In some embodiments, the proposed change request includes the fields of a change request with values extracted from the properties of the vulnerability group. Values of the proposed change request that are populated can include an implementation plan and various description fields. For example, the remediation plan associated with assets of the vulnerability group can be used to populate the implementation plan field of the proposed change request. Similarly, a short description and/or long description field of the proposed change request can be populated with values related to the vulnerability group. For example, a short description field can be populated with the severity of the vulnerability and additional vulnerability information such as a publicly disclosed security profile of the vulnerability. In some embodiments, the vulnerability information includes information from a shared and/or public vulnerability database and can include Common Vulnerabilities and Exposures (CVE) information such as a CVE identifier, a description or explanation, dates, and comments of the vulnerability. Additionally, a description field including a second longer description field can include vulnerability information related to the particular information technology environment including the identifier of the vulnerability group.

At 503, a machine learning model is applied to determine match scores for pending change requests. For example, a trained machine learning model is used to predict match scores for the vulnerability group from pending change requests. In various embodiments, at least one input to the trained machine learning model is the proposed change request created at 501. For example, features for the model can include the populated fields of the proposed change request including an implementation field and various description fields such as a short description and a longer description field. The prediction output of the model can be the match scores for existing change requests that are pending. The match scores can predict how likely a corresponding change request addresses the vulnerabilities of the vulnerability group.

At 505, recommended matching change requests are determined. For example, based on the match scores predicted at 503, the pending change requests are evaluated and one or more of the pending change requests are designated as recommended change requests. In some embodiments, only change requests that have a match score that exceeds a configured confidence threshold value are recommended as matching change requests. In some embodiments, the number of recommended matching change requests is limited to a maximum number of change requests and only the top requests are recommended. Although the match score is used to determine whether or not to recommend a change request, other factors of the change requests may also be considered in addition to the match score. Additional factors that can be considered include, for example, the scheduled date, the expected downtime, the approval process required, and the expected incurred expense of a change request, among other factors. In some embodiments, the recommended matching change requests are stored in an associated database such as a configuration management database (CMDB) and/or an application services database.

At 507, one or more recommended matching change requests are provided. For example, the change requests determined as recommended matching change requests are provided to a remediation system such as a remediation engine of a remediation system. In some embodiments, the remediation engine further provides the recommended matching change requests to a remediation owner via a remediation service. For example, a remediation owner is provided with the recommended change requests for a vulnerability group and their associated properties such as their corresponding match scores via a user interface of a remediation service that is connected to a remediation engine.

Figure 6:
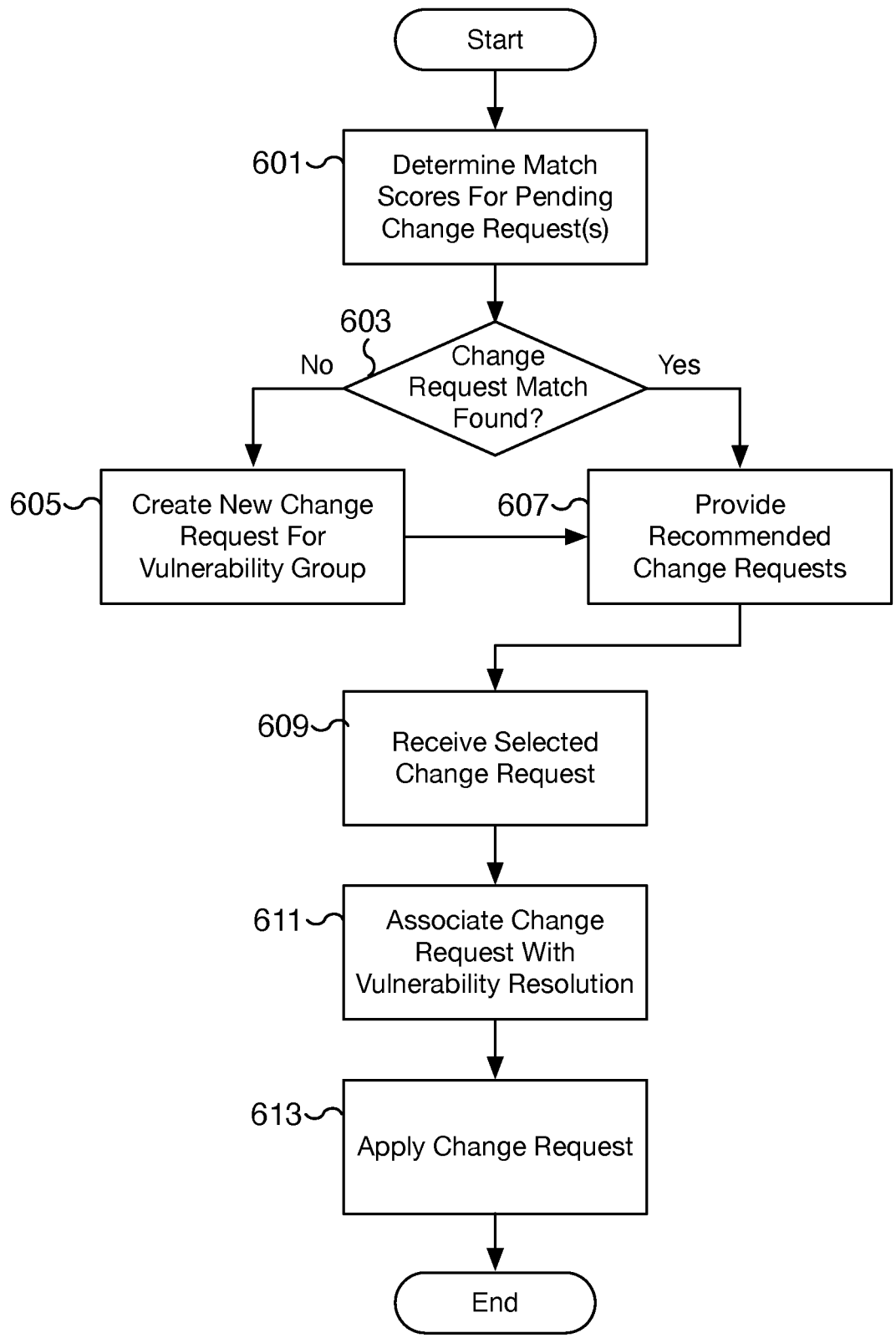
FIG. 6 is a flow chart illustrating an embodiment of a process for determining a vulnerability response for a vulnerability group.

FIG. 6 is a flow chart illustrating an embodiment of a process for determining a vulnerability response for a vulnerability group. Using the process of FIG. 6, an information technology remediation owner can address the vulnerabilities of a vulnerability group by assigning a change request to the vulnerability group as an appropriate vulnerability response. Once a vulnerability response is determined, the assigned change request can be implemented at a later date by a different technology group. For example, the assigned change request can be assigned to an information technology service management administrator who has the proper access and permissions to schedule, implement, and communicate the changes of the change request. In some embodiments, the process of FIG. 6 is performed at 205 and/or 207 of FIG. 2 and/or at 405 and/or 407 of FIG. 4, and/or utilizes the process of FIG. 5. In some embodiments, the process of FIG. 6 is performed at least in part by an application service such as a cloud-based service of application services 101 of FIG. 1 and/or by a remediation engine such as remediation engine 103 of FIG. 1. In some embodiments, the vulnerable assets of the vulnerability group are assets of an information technology environment such as customer information technology environment 121 of FIG. 1. In some embodiments, the vulnerability group and related configuration data are stored in a database such as application services database 105 of FIG. 1.

At 601, match scores for pending change requests are determined. For example, for each applicable change request, a match score is predicted to determine the likelihood that a pending change request will resolve the vulnerabilities of the vulnerability group. In various embodiments, the match scores are predicted by applying a trained machine learning model to the vulnerability group.

At 603, a determination is made whether a change request match is found. In various embodiments, a change request is a matching change request if its match score exceeds a configured confidence threshold level. In the event no change request match is found, processing proceeds to 605. In the event at least one change request match is found, processing skips step 605 and proceeds directly to 607.

At 605, a new change request is created for the vulnerability group. For example, a new change request is created since no pending change request is appropriate and is not a match for the vulnerability group from among the pending change requests. In various embodiments, the new change request is created based on the remediation plan for the items of the group.

At 607, recommended change requests are provided. For example, if matching change requests are found, one or more pending change requests are recommended as a vulnerability response for the vulnerability group. If no matching change requests are found among pending change requests, the new change request created at 605 is recommended as the vulnerability response. In some embodiments, the recommended change requests are provided in a ranked order based on match score. The recommended change requests may be viewed by a remediation owner from a cloud-based remediation service. For example, a remediation owner can view the recommended change requests along with their respective properties such as their match scores, implementation plans, titles, and various descriptions.

At 609, a selected change request is received. For example, the remediation owner selects a change request from the change requests recommended at 607. In some embodiments, the selected change request is selected via a graphical user interface of a remediation service that displays the recommended change requests and allows the user to inspect each provided recommendation.

At 611, the change request is associated with a vulnerability resolution. For example, the change request selected at 609 is associated with a vulnerability resolution for the vulnerability group. Once the associated change request is applied, the vulnerabilities of the vulnerability group will be resolved. In some embodiments, once the change request is associated with the vulnerability group, the vulnerabilities of the vulnerability group are no longer open vulnerabilities and the remediation state of the group is updated. In some embodiments, once a change request is associated with a vulnerability group, the owner of the change request may be notified of the new association. For example, an information technology service management administrator assigned to implement the change request may be notified that the change request is a vulnerability resolution for the vulnerability group.

At 613, the change request is applied. For example, the change request is assigned to a change request implementation owner such as an information technology service management administrator. The owner of the change request implements the change request to apply to appropriate fixes to the targeted assets. In some embodiments, the application of a change request involves notifying impacted users of a scheduled downtime as well as notifying users when the change request is complete. In various embodiments, the applied change request addresses the vulnerabilities of the vulnerability group but may also address other issues, whether related or not to the resolved vulnerabilities, of the assets of the group. In some embodiments, the completion of the change request initiates an update to the configuration items of the associated assets in a configuration management database (CMDB). For example, among other properties such as the configuration state of the updated assets, the remediation state of each of the updated assets with respect to the vulnerability group and their vulnerabilities are updated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    training a machine learning model based at least on previous change requests, wherein each of the previous change requests are associated with a controlled management of a lifecycle of a change to an information technology environment;
    identifying a security vulnerability of the information technology environment;
    using the trained machine learning model, determining for the security vulnerability a corresponding match score for each of a plurality of pending change requests; and
    receiving an indication of whether a resolution specification for the security vulnerability is to be linked with one of the plurality of pending change requests selected based on a factor associated with its corresponding match score.

2. The method of claim 1, wherein determining for the security vulnerability the corresponding match score for each of the plurality of pending change requests includes utilizing machine learning model input features associated with an implementation plan of the security vulnerability and one or more descriptions of the security vulnerability.

3. The method of claim 2, wherein at least one of the one or more descriptions of the security vulnerability includes a vulnerability identifier.

4. The method of claim 3, wherein the at least one of the one or more descriptions of the security vulnerability includes an explanation of the security vulnerability and a date associated with the security vulnerability.

5. The method of claim 2, wherein at least one of the one or more descriptions of the security vulnerability includes a vulnerability group identifier associated with vulnerable assets of the information technology environment.

6. The method of claim 2, wherein at least one of the one or more descriptions of the security vulnerability includes a description of the information technology environment associated with vulnerable assets of the information technology environment.

7. The method of claim 1, further comprising creating a proposed change request based on the security vulnerability, wherein determining for the security vulnerability the corresponding match score for each of the plurality of pending change requests includes applying the trained machine learning model to the proposed change request, and wherein the proposed change request is associated with an implementation plan field and one or more description fields.

8. The method of claim 1, further comprising identifying a remediation plan for the security vulnerability of the information technology environment, wherein the one of the plurality of pending change requests selected based on the factor associated with its corresponding match score implements the remediation plan.

9. The method of claim 1, wherein identifying the security vulnerability of the information technology environment includes identifying a group of vulnerable assets of the information technology environment impacted by the security vulnerability.

10. The method of claim 1, wherein training the machine learning model based at least on the previous change requests includes utilizing as machine learning features an implementation plan field and one or more description fields of the previous change requests.

11. A system, comprising:
    one or more processors; and
    a memory coupled to the one or more processors, wherein the memory is configured to provide the one or more processors with instructions which when executed cause the one or more processors to:
        train a machine learning model based at least on previous change requests, wherein each of the previous change requests are associated with a controlled management of a lifecycle of a change to an information technology environment;
        identify a security vulnerability of the information technology environment;
        determine using the trained machine learning model for the security vulnerability a corresponding match score for each of a plurality of pending change requests; and
        receive an indication of whether a resolution specification for the security vulnerability is to be linked with one of the plurality of pending change requests selected based on a factor associated with its corresponding match score.

12. The system of claim 11, wherein causing the one or more processors to determine for the security vulnerability the corresponding match score for each of the plurality of pending change requests includes causing the one or more processors to utilize machine learning model input features associated with an implementation plan of the security vulnerability and one or more descriptions of the security vulnerability.

13. The system of claim 12, wherein at least one of the one or more descriptions of the security vulnerability includes a vulnerability identifier.

14. The system of claim 13, wherein the at least one of the one or more descriptions of the security vulnerability includes an explanation of the security vulnerability and a date associated with the security vulnerability.

15. The system of claim 12, wherein at least one of the one or more descriptions of the security vulnerability includes a vulnerability group identifier associated with vulnerable assets of the information technology environment and a description of the information technology environment associated with the vulnerable assets of the information technology environment.

16. The system of claim 11, wherein the memory is further configured to provide the one or more processors with instructions which when executed cause the one or more processors to:
    create a proposed change request based on the security vulnerability, wherein determining for the security vulnerability the corresponding match score for each of the plurality of pending change requests includes applying the trained machine learning model to the proposed change request, and wherein the proposed change request is associated with an implementation plan field and one or more description fields.

17. The system of claim 11, wherein the memory is further configured to provide the one or more processors with instructions which when executed cause the one or more processors to:
  identify a remediation plan for the security vulnerability of the information technology environment, wherein the one of the plurality of pending change requests selected based on the factor associated with its corresponding match score implements the remediation plan.

18. The system of claim 11, wherein identifying the security vulnerability of the information technology environment includes identifying a group of vulnerable assets of the information technology environment impacted by the security vulnerability.

19. The system of claim 11, wherein training the machine learning model based at least on the previous change requests includes utilizing as machine learning features an implementation plan field and one or more description fields of the previous change requests.

20. A computer program product, the computer program product being embodied in a non-transitory computer readable storage medium and comprising computer instructions for:
  training a machine learning model based at least on previous change requests, wherein each of the previous change requests are associated with a controlled management of a lifecycle of a change to an information technology environment;
  identifying a security vulnerability of the information technology environment;
  using the trained machine learning models, determining for the security vulnerability a corresponding match score for each of a plurality of pending change requests; and
  receiving an indication of whether a resolution specification for the security vulnerability is to be linked with one of the plurality of pending change requests selected based on a factor associated with its corresponding match score.

* * * * *